United States Patent [19]

Harrison

[11] 4,417,987

[45] Nov. 29, 1983

[54] PROCESS FOR DETOXIFICATION

[75] Inventor: Anthony P. Harrison, Rochdale, England

[73] Assignee: Interox Chemicals Limited, London, England

[21] Appl. No.: 328,109

[22] Filed: Dec. 7, 1981

[30] Foreign Application Priority Data

Dec. 12, 1980 [GB] United Kingdom ............... 8039829

[51] Int. Cl.$^3$ ............................................. C02F 1/72
[52] U.S. Cl. .................................... 210/759; 210/904
[58] Field of Search ............... 210/759, 904, 721, 698; 204/DIG. 13, 149

[56] References Cited

U.S. PATENT DOCUMENTS 3,617,567 11/1971 Mathre ................................. 210/904
3,843,516 10/1974 Yamada et al. .................... 210/904
3,970,554 7/1976 Fischer et al. ...................... 210/759

Primary Examiner—Benoît Castel
Attorney, Agent, or Firm—Larson and Taylor

[57] ABSTRACT

When aqueous solutions of a metal cyanide complex are detoxified with hydrogen peroxide, a residue of cyanide remains, which in the case of nickel for example may be present as $Ni(CN)_2$. In a process according to the present invention the detoxification of aqueous alkaline solutions of a metal cyanide complex is carried out using a restricted amount of certain complexing agents together with the hydrogen peroxide. A particularly suitable example of such complexing agents is ethylenediaminotetraacetic acid. It is especially preferred to use the complexing agent in a mole ratio to metal of from 0.8:1 to 1.5:1, together with hydrogen peroxide in a mole ratio to cyanide of from 2:1 to 3:1. The process is well suited to the treatment of concentrated solutions of cyanide, in many cases at least 4000 ppm, for example those resulting from the stripping of nickel plating.

17 Claims, No Drawings

PROCESS FOR DETOXIFICATION

The present invention relates to a process for the detoxification of aqueous solutions of cyanide and, in particular, to solutions of metal cyanide complexes by reaction with hydrogen peroxide.

The principle of using hydrogen peroxide to detoxify aqueous solutions of inorganic cyanides has been known for some time. Thus, for example, J. Broucek indicated in Koroce a Ochrana Materialu, 1962, pp 95–96 that sodium cyanide could be oxidised, and he thought that it was mainly to ammonia and that turbidity due to copper hydroxide could be readily measured. The use of a catalyst such as copper sulphate to accelerate cyanide destruction using hydrogen peroxide was disclosed by F. Oehme in 1966 in Tech. Eau (Brussels) No 237. Naturally it will be recognised that in practice the hydrogen peroxide used commercially is stabilised against decomposition during storage by addition of a small amount generally in the region of 50 to 100 ppm of conventional stabilisers, for example those referred to in French patent specification No. 1 564 915. Herein ppm indicates $g/m^3$ unless otherwise stated.

Although the above-mentioned methods are comparatively effective against most simple inorganic cyanides, when they are applied to the detoxification of metal cyanide complexes a relatively high proportion of the cyanide remains, despite the addition of levels of copper catalyst disclosed in the literature to be adequate for accelerating cyanide detoxification. As a result of the present investigations which had as their objective the lowering of the residual cyanide level from metal cyanide complexes it is now believed that the detoxification using the methods outlined above quite possibly terminates with the formation of a normal metal cyanide salt, for example in the case of nickel, $Ni(CN)_2$. However, it will be understood that the present invention is not based specifically upon any particular theory or explanation.

It has been found in the course of the present investigations that the extent of detoxification of metal cyanide complexes can be improved by carrying out the detoxification in the presence of a restricted amount of selected complexing agents. Where other than a restricted amount of the appropriate complexing agents or inappropriate complexing agents are employed, less or no substantial improvement was detectable.

According to the present invention, there is provided a process for the detoxification of an aqueous alkaline solution of a metal cyanide complex by introduction therein of hydrogen peroxide in the presence of a complexing agent in a mole ratio to the metal of from 0.5:1 to 3:1 which can form with nickel cyanide a mixed ligand complex having a stability constant as herein defined of not greater than 9.5.

The suitability of the complexing agent is determined by reference to the value of the stability constant of the nickel mixed ligand complex. The term "stability constant" as used herein means the constant $\beta_{12}$, expressed a logarithm to the base of 10 for the dissociation reaction $$NiL(CN)_2{}^{n-} \rightleftharpoons NiL^{2-n} + 2CN^-$$

wherein L represents a molecule of the complexing agent and $$\beta_{12} = \frac{[NiL(CN)_2{}^{n-}]}{[NiL^{2-n}][CN^-]^2}$$

The stability constant, together with a method for its measurement for such complexes is given in an article entitled "Determination of Stability Constants of Mixed Ligand Complexes by Kinetic Method: Part II—Mixed Ligand complexes of Aminocarboxylates & Cyanide Ion with Nickel(II)" by K Kumar and P C Nigam and published in the Indian Journal of Chemistry Volume 18A, September 1979 pp 247–251.

One suitable class of complexing agents comprises aminocarboxylic acids which form metal complexes having a stability constant as defined herein of not more than 9.5. It will be recognised that under alkaline conditions the aminocarboxylic acids will be wholly or partly in carboxylate form and can be introduced in acid form or in the form of a salt, usually a soluble salt. In many cases, the complexing agent is selected within the class of aminoacetic acids/salts.

EXAMPLES OF SUITABLE COMPLEXING AGENTS

| Example | Abbreviation | Stability Constant Of Complex |
|---|---|---|
| Nitrilotriacetic acid | NTA | 7.72 |
| Diethylenetriaminopentaacetic acid | DTPA | 3.36 |
| Ethylenediaminediacetic acid | EDDA | 8.18 |
| 1,2-diaminopropanetetraacetic acid | 1,2 PDTA | 4.55 |
| 1,3-diamino-2-hydroxypropane-tetraacetic acid | HPDTA | 6.18 |
| Ethylenediaminetetraacetic acid | EDTA | below 0 |

It will be recognised that the stability constant can have a negative value. It is preferable to select complexing agents which form complexes that have as low a value as possible of the stability constant. In consequence, preferred complexing agents form complexes, the stability constant for which is below 8 such as DTPA and especially preferred complexing agents form complexes the stability constant for which has a negative value, such as EDTA.

EXAMPLES OF UNSUITABLE COMPLEXING AGENTS

| Example | Abbreviation | Stability Constant Of Complex |
|---|---|---|
| 1,2-diaminocyclohexane-tetraacetic acid | CDTA | na |
| Iminodiacetic acid | IDA | 11.21 |

When unsuitable complexing agents are used, such as those above-exemplified or others such as ethylenediaminotetramethylenephosphonic acid, the residual cyanide content is markedly higher, often an order of magnitude or greater than when using the selected complexing agents according to the present invention under practical working conditions.

In the course of the investigation, it was found that the extent of detoxification increases as the mole ratio of complexing agent to metal is increased until a mole ratio of 1:1 is attained and thereafter gradually decreases. Thus, it is preferable for the mole ratio of complexing agent:metal to be selected within the range of 0.6:1 to 2:1 and especially from 0.8:1 to 1.5:1. In many instances the complexing agent:metal mole ratio will be 1:1 (+/−5%).

It is preferable to employ at least a stoichiometric amount of hydrogen peroxide, i.e. a mole ratio of $H_2O_2:CN^-$ of at least 1:1. In practice, the mole ratio is usually selected within the range of from 1.5:1 to 5:1, and in many instances the mole ratio is selected in the range of 2:1 to 3:1. Although it is possible to introduce the hydrogen peroxide in a single addition, more effective utilisation of the hydrogen peroxide can be achieved under many circumstances if it is introduced either in a plurality of incremental additions, for example 3 or 4 times at intervals during the reaction period often substantially regularly, or by progressively introducing the reagent throughout all or the greater part of the reaction period, such as 50–80% or by some combination in which, for example, part of the hydrogen peroxide is introduced initially and the remainder is introduced progressively.

Although it is possible to carry out the reaction in the absence of added copper catalyst, it is preferable that a catalytic amount of a copper salt is employed, taking advantage of the fact that the copper catalyst is believed to act by forming a copper cyanide complex which reacts with the hydrogen peroxide. In fact, it has been found that the acceleration of the rate increased by the addition of a copper salt to other metal cyanide complexes complements the enhanced extent of detoxification obtained by addition of the complexing agent. Indeed the addition of the suitable complexing agents enhances even the detoxification of copper cyanide complexes. As a consequence, it is desirable for the cyanide solutions to contain at least 10 ppm copper. If insufficient copper is present it can be added, preferably to a concentration of from 50 to 200 ppm copper, advantageously in the form of a readily water soluble cupric salt, such as cupric sulphate, cupric chloride, cupric nitrate or cupric acetate. Higher concentrations of copper, even in the region of 1000 to 10000 ppm can be present in this process, but it will be recognised that if the detoxified solution is to be discharged into a watercourse, subsequent removal of the copper for example using an ion exchange resin should preferably be carried out.

In practice, it is desirable to maintain the aqueous alkaline cyanide solution at a pH greater than that at which hydrogen cyanide gas is evolved, so that a pH of at least pH 9 and often in the range of from pH 9.5 to pH 12 is normally selected. A convenient pH is often at around pH 10.

The pH of the alkaline solution can be controlled by conventional means, e.g. by linking a pH electrode to control the introduction of an aqueous alkali such as sodium hydroxide solution, should the solution fall below a predetermined pH, such as pH 9.5.

The process of the present invention is well suited to the treatment of metal cyanides complexes in which the complex has the formula $M(CN)_4^{2-}$ where M represents the metal. Specific examples of such complexes include nickel and the group 1B (i.e. copper, silver, gold) cyanide complexes.

The process of the present invention is especially suitable for the detoxification of comparatively concentrated solutions of the metal cyanide. Such solutions often have a content of at least 4000 ppm cyanide and for example at least 1000 or 2000 ppm nickel or other metal such as copper. In consequence, the present invention is of particular value in the detoxification of nickel stripping solution, which in many cases have a nickel content in the range of from 3000 to 7000 ppm and the cyanide content in the range of from 1000 to 4000 ppm. Such stripping solutions often contain very high concentrations, such as 25000 to 30000 ppm, of sodium meta-dinitrobenzenesulphonate which renders impractical the detoxification of such solutions with hypochlorite or by electrolysis. The sulphonate appears to have no detrimental effect, in a process according to the present invention. Copper cyanide solutions which can be treated effectively in the present invention typically contain copper in the range of 2000 to 10000 ppm and cyanide 4000 to 20000 ppm.

It will be readily understood, that although the process of the present invention is extremely well suited for treating concentrations of cyanide within the aforementioned ranges, higher concentrations can be treated merely by employing the appropriate mole ratio of complexing agent to metal and hydrogen peroxide to cyanide, but in preference also dividing the hydrogen peroxide addition into a slightly larger number of incremental additions. Naturally, the present invention copes with lower concentrations of metal and cyanide of e.g. 500 to 1000 ppm nickel or copper without undue difficulty.

The reaction between the metal cyanide and hydrogen peroxide is exothermic. It is preferable to maintain the cyanide solution after introduction of the hydrogen peroxide at a temperature of not greater than 70° C., and especially from 60° to 70° C. and it will be recognised that cooling of the solution may be needed. It will be recognised that the extent of cooling is dependent on the initial concentration of cyanide in the solution and on the mode of introduction of the hydrogen peroxide, i.e. whether it is single stage or incremental or progressive. The reaction time depends at least partly upon the residual concentration of cyanide in the solution that can be tolerated by the user of the invention process. Broadly speaking, the extent of detoxification continues to increase with the effluxion of time. It is desirable to employ a reaction period of at least 30 minutes, and in practice the reaction period is often at least 60 minutes, in many cases being up to 150 minutes. It will be understood, though, that a reaction period in excess of 150 minutes can be employed, if desired, and can continue to show an increase in detoxification, especially where the complexing agent used forms a metal complex which has a stability constant at the upper end of the range, for example in the range of from 4 to 9.5, such as NTA or EDDA.

Having described the invention in general terms, specific embodiments will be described hereinafter more fully by way of example only.

In the Examples and comparisons, the concentrations of nickel were determined in most cases by a standard atomic absorption spectrophotometric technique and in the remaining measurements by difference between the total cyanide and free cyanide measurements. The cyanide concentrations were measured as described in "Standard Methods for the Examination of Water and Waste Water" (13th Edition) published by the American Public Health Association et al. Comparisons are designated by the prefix C.

In each of the Examples and comparisons, C1 to C15, for the detoxification of nickel cyanide, and C16 to 19 for the detoxification of copper cyanide, a sample (100–200 ml) of solution having the characteristics shown in the Table below was introduced into a reaction vessel into which thereafter first, the specified complexing agent was introduced in a mole ratio to nickel specified in the Table as mole ratio CA:Ni or CA:Cu respectively and then copper sulphate was introduced into the nickel cyanide solutions, but not into the copper cyanide solutions, to give a concentration as Cu of 100 ppm, except in Example 6 and comparison C1, where no copper was present. In each case, the pH of the solution was then adjusted to and maintained at pH 10 by introduction of caustic soda as required, during the incremental addition of hydrogen peroxide to a total amount of the latter expressed in the Table as a mole ratio of $H_2O_2$:CN. The hydrogen peroxide was introduced in the form of the standard 35% by weight aqueous solution commercially available from Interox Chemicals Limited. In all the Examples and comparisons except Example 9 the hydrogen peroxide solution was added in three equal portions at 30 minute intervals and in Example 9 the hydrogen peroxide was added in four equal portions, again at 30 minute intervals. The residual cyanide content of the solution was measured 30 minutes after the final portion of hydrogen peroxide had been introduced and the result is expressed in the Table both as measured and as a percentage of the initial total cyanide content.

The complexing agents are referred to by their initials and the key to them will be found in the text hereinbefore, with the exception of EDTMPA in comparison C4 which is ethylenediaminetetramethylenephosphonic acid, hexapotassium salt. In each of comparisons C5 and C7 and Examples 6, 8, 9, 10 and 11, the cyanide solution contained sodium meta-dinitrobenzenesulphonate at an initial concentration in excess of 20000 ppm.

THE TABLE

| Ex No | Initial Concentration Metal ppm | Initial Concentration CN ppm | Complexing Agent | Mole Ratio CA: Metal | Mole Ratio $H_2O_2$:CN | Residual CN Conc ppm | Residual CN % of initial Conc |
|---|---|---|---|---|---|---|---|
| | Nickel | | | CA:Ni | | | |
| C1 | 7900 | 14200 | — | — | 1.5 | 12200 | 85.9 |
| C2 | 7900 | 14200 | — | — | 1.5 | 9400 | 66.2 |
| 3 | 7900 | 14200 | EDTA | 1:1 | 1.5 | 760 | 5.3 |
| C4 | 7900 | 16760 | EDTMPA | 1:1 | 1.5 | 4430 | 26.4 |
| C5 | 3100 | 18100 | — | — | 2.5 | 850 | 4.5 |
| 6 | 3600 | 14100 | EDTA | 1:1 | 2.5 | 620 | 4.4 |
| C7 | 3600 | 14100 | EDTA | 0.28:1 | 2.5 | 550 | 3.9 |
| 8 | 2600 | 14100 | EDTA | 1:1 | 2.5 | 20 | 0.14 |
| 9 | 3400 | 39240 | EDTA | 1:1 | 2.5 | 20 | 0.05 |
| 10 | 7700 | 24250 | EDTA | 1:1 | 2.5 | 20 | 0.08 |
| 11 | 3200 | 22170 | EDTA | 1:1 | 2.5 | 13 | 0.06 |
| 12 | 7900 | 16760 | NTA | 1:1 | 2.5 | 35 | 0.2 |
| 13 | 7900 | 16760 | DTPA | 1:1 | 2.5 | 105 | 0.6 |
| C14 | 7900 | 16760 | IDA | 1:1 | 2.5 | 1910 | 11.4 |
| C15 | 7900 | 16760 | CDTA | 1:1 | 2.5 | 5000 | 30 |
| | Copper | | | CA:Cu | | | |
| C16 | 2800 | 5000 | — | — | 2.5 | 329 | 6.6 |
| C17 | 8500 | 15000 | — | — | 2.5 | 2883 | 19.2 |
| 18 | 2800 | 5000 | EDTA | 1:1 | 2.5 | 11 | 0.2 |
| 19 | 8500 | 15000 | EDTA | 1:1 | 2.5 | 23 | 0.15 |

From the Table above, it will be observed that a marked improvement was obtained using complexing agents NTA, DTPA, and EDTA in a mole ratio to metal according to the present invention but that if the mole ratio to metal was outside the range specified, then the improvement in residual cyanide was markedly less. Similarly, it will be observed that complexing agents IDA, CDTA and EDTMPA produced markedly inferior results to using complexing agents selected according to the present invention. Thirdly, it will be observed that the residual content of cyanide in solution was not affected to a great extent by the initial ratio of metal to total cyanide in the solution. Fourthly, it will be seen that the use of the complexing agents without copper catalyst agents for detoxifying nickel cyanide, could provide a result of similar quality to that provided by a copper catalyst, but that addition of a copper catalyst led to an accelerated removal of cyanide from solution. Finally it can be seen that a mole ratio of hydrogen peroxide to cyanide of 2.5 to 1 gave better detoxification than if a mole ratio of 1.5 to 1 was used.

I claim:

1. In a process for the detoxification of an aqueous alkaline solution of a metal cyanide complex by introduction thereinto of hydrogen peroxide, the improvement wherein detoxification is effected in the presence of a complexing agent in a mole ratio to metal in the metal cyanide of from 0.5:1 to 3:1, said complexing agent being one which can form with nickel cyanide a mixed ligand complex having a stability constant $\beta_{12}$ of not greater than 9.5, said stability constant $\beta_{12}$ being expressed as a logarithm to the base 10 for the dissociation reaction $$NiL(CN)_2{}^{n-} \rightleftharpoons NiL^{2-n} + 2CN^-$$

wherein L represents a molecule of the complexing agent and wherein

$$\beta_{12} = \frac{[NiL(CN)_2{}^{n-}]}{[NiL^{2-n}][CN^-]^2}.$$

2. A process according to claim 1 wherein the metal cyanide complex comprises a nickel cyanide complex.

3. A process according to claim 2 where the nickel containing cyanide solution is obtained by stripping nickel.

4. A process according to claim 1 or 2 wherein the detoxification is carried out in the presence of a catalytic amount of copper.

5. A process according to claim 1 wherein the metal cyanide complex comprises a copper cyanide complex.

6. A process according to claim 1, 2 or 5 wherein the complexing agent is used in a mole ratio to metal of from 0.8:1 to 1.5:1.

7. A process according to claim 1, 2 or 5 wherein the complexing agent employed is capable of forming with nickel a complex having a stability constant $\beta_{12}$ of below 8.

8. A process according to claim 1, 2 or 5 wherein the complexing agent comprises an aminocarboxylic acid or salt thereof.

9. A process according to claim 8 wherein the complexing agent comprises ethylenediaminetetraacetic acid or salt thereof.

10. A process according to claim 1, 2 or 5 wherein the hydrogen peroxide is employed in a mole ratio to the cyanide of from 2:1 to 3:1.

11. A process according to claim 1, 2 or 5 wherein the starting cyanide concentration is at least 4000 ppm.

12. A process according to claim 1, 2 or 5 wherein the detoxification is maintained at a temperature not in excess of 70° C.

13. A process according to claim 1, 2 or 5 wherein the detoxification period is at least 30 minutes.

14. A process according to claim 1, 2 or 5 wherein hydrogen peroxide is employed in a mole ratio to the cyanide of from 2:1 to 3:1 in the presence of at least a catalytic amount of copper and of an aminoacetic acid or salt complexing agent.

15. A process according to claim 14 wherein the complexing agent comprises ethylenediaminetetraacetic acid or a soluble salt thereof.

16. A process according to claim 15 wherein mole ratio of complexing agent:cyanide is 1:1±5%.

17. A process according to claim 1 wherein said metal cyanide complex comprises a group 1B metal cyanide complex.

* * * * *